United States Patent [19]
Boren

[11] Patent Number: 5,686,658
[45] Date of Patent: Nov. 11, 1997

[54] ABOVEGROUND LIQUID STORAGE TANK LEAKAGE DETECTION

[75] Inventor: Donald E. Boren, Melbourne, Fla.

[73] Assignee: ASTTest Services, Inc., Melbourne, Fla.

[21] Appl. No.: 539,711

[22] Filed: Oct. 5, 1995

[51] Int. Cl.⁶ .................................................. G01M 3/32
[52] U.S. Cl. ........................................ 73/49.2; 73/314
[58] Field of Search ........................... 73/49.2, 305, 307, 73/308, 309, 313, 314

[56] References Cited

U.S. PATENT DOCUMENTS

| | | | |
|---|---|---|---|
| 3,537,298 | 11/1970 | Kapff | 73/49.2 |
| 3,538,745 | 11/1970 | Wright et al. | 73/49.2 |
| 3,538,746 | 11/1970 | Jacobs et al. | 73/49.2 |
| 4,386,525 | 6/1983 | Mooney | 73/49.2 |
| 4,646,560 | 3/1987 | Maresca et al. | 73/49.2 |
| 4,672,842 | 6/1987 | Hasselmann | 73/49.2 |
| 4,732,035 | 3/1988 | Lagergren et al. | 73/49.2 |
| 4,796,469 | 1/1989 | Brown et al. | 73/319 X |
| 4,852,054 | 7/1989 | Mastandrea | 73/49.2 |
| 4,893,498 | 1/1990 | Jensen | 73/49.2 |
| 4,914,943 | 4/1990 | Lagergren | 73/49.2 |
| 4,964,296 | 10/1990 | Jensen | 73/49.2 |
| 4,993,257 | 2/1991 | Lagergren | 73/49.2 |
| 5,088,317 | 2/1992 | Jensen | 73/49.2 |
| 5,131,264 | 7/1992 | Jensen | 73/49.2 |
| 5,156,042 | 10/1992 | Carlin et al. | 73/49.2 |
| 5,209,106 | 5/1993 | Carlin | 73/49.2 |
| 5,245,869 | 9/1993 | Clarke et al. | 73/49.2 |

*Primary Examiner*—Michael Brock
*Attorney, Agent, or Firm*—Brooks Haidt Haffner & Delahunty

[57] ABSTRACT

An aboveground storage tank is provided with a mass balance system for quantitative detection of leakage of liquid from a tank. Arrays of temperature sensors measure the exterior wall temperature of the tank and temperature sensors in an open-ended standpipe within the tank measure the temperature of stored liquid. The temperature measurements and measurements of liquid level change in a chamber mounted at the upper end of the standpipe are polled at intervals to detect changes of the mass of liquid within the tank.

14 Claims, 2 Drawing Sheets

ABOVEGROUND LIQUID STORAGE TANK LEAKAGE DETECTION

BACKGROUND OF THE INVENTION

1. Field of the Invention

The invention relates to a method and apparatus for the detection of leakage of liquid from storage tanks, and more particularly to the sensing and measurement of liquid leakage at slow rates from large aboveground storage tanks of the type used to store fuel oil.

2. Description of the Prior Art

Storage tanks for liquids develop leaks that escape usual detection methods and cannot be discovered by standard inventory control procedures. No practical system has been available for detecting small leaks in aboveground storage tanks that does not entail going through the costly and time consuming procedure of draining and cleaning the tanks.

There are known systems for testing relatively small underground storage tanks, i.e., tanks with a capacity of less than 20,000 gallons, which have a high probability of detecting leaks as small as 0.1 gallons per hour from such relatively small tanks. The detection of leakage at a rate of 0.1 gallons per hour from a 20,000 gallon tank requires the ability to detect leakage of 5 parts per million of the stored liquid per hour. Gasoline is stored in relatively small tanks at thousands of filling stations, and the art of detecting leakage from such tanks is well developed. There are government regulations that set leakage detection standards for underground storage tanks.

Tanks used for storage of liquid aboveground can be much larger than such underground tanks, and a single tank may hold millions of gallons of liquid. To be truly useful, a leak detection system for large aboveground tanks should be able to detect leaks as small as 0.5 gallons per hour, a task that is an order of magnitude more demanding than the capability shown by the prior art.

The function of a storage tank can be defined as the confinement without loss of all of the liquid mass stored therein so long as all input and output valves of the tank are closed. Any loss of mass through an unknown orifice in the tank or escape of liquid from the tank as vapor is regarded as leakage. Since there is no practical way to measure the total mass contained within a large storage tank, any changes in the stored mass must be approximated by the measurement of related factors such as pressure, volume and height.

It is elementary that the fluid pressure at any level is equal to the product of the height above that level, the average density of the fluid, and the acceleration due to gravity (height×weight density) and that pressure is the same throughout a horizontal plane for a fluid in a steady state condition. Thus the pressure at the bottom of a tank remains constant when there is no leakage and no thermal expansion of the tank shell that changes the area of the tank (and hence changes the total mass over a unit area of the tank bottom).

The total volume of the liquid contained in a tank changes as a result of thermal expansion or contraction of the liquid, but unless there is leakage, the total mass of the liquid does not change. Thermal expansion of the tank shell results in lowering the height of the surface of a body of liquid of unchanged mass contained in a tank. But direct measurement of the volume of liquid stored in a large tank is not a practical possibility.

Although the absolute height of the surface of a liquid in a tank is extremely difficult to measure with high accuracy, change in the height or level of the surface of a body of liquid contained in a tank, which is affected by thermal expansion or contraction of the liquid and of the tank shell as well as loss due to leakage, can be measured accurately.

Changes in the total mass of the liquid stored in a tank can be detected by measurement of changes in the internal pressure at the bottom of the tank, or of changes in the height of the liquid surface, or a combination of such measurements, if properties that affect those measurable quantities can themselves be measured and compensated.

Prior known methods for detecting leaks from liquid storage systems fall into two general categories: (a) quantitative methods that estimate the time rate of loss of liquid in the tank; (b) qualitative methods that identify tracer chemicals or the stored liquid itself in vapor and soil samples collected from the area surrounding the tank.

The present invention relates to a quantitative method and to apparatus for carrying out the method. The accuracy and precision of prior art quantitative leak detection procedures have been limited. The accuracy of detection based on bottom pressure measurements made with pressure gauges, differential pressure gauges and bubble manometer systems depends upon the accuracy of pressure change measurements and does not take into account the effect of thermal expansion or contraction of the tank shell. A liquid leak detector for aboveground tanks is shown and described in Jensen U.S. Pat. No. 4,893,498, wherein change in the liquid pressure at the bottom of a tank is detected by a pressure transducer located in a standpipe seated on the ground adjacent the tank.

Change in volume of the liquid in a tank inferred from the liquid surface level in an open tank and a vertical temperature profile of the stored liquid also requires compensation for the thermal expansion or contraction of the tank shell. Attempts to take thermal expansion into account by using temperature measurements made on the exterior tank wall have had limited success.

Liquid level change measurement approaches have been used successfully in small underground storage tanks that are protected from rapidly changing ambient temperature. The exterior tank walls of underground storage tanks are not exposed to the heating effect of radiant solar energy. U.S. Pat. Nos. 3,538,745 and 5,156,042 show systems for leak detection by measurement of changes in the liquid level in underground tanks. In accordance with U.S. Pat. No. 3,538,745 a float is connected to a linear variable displacement transformer for measuring changes in the surface height of liquid and a temperature sensor for measuring the temperature of liquid in the tank. The linear variable displacement transformer ("LVDT") is a well known device used for measuring changes in linear position. One manufacturer of LVDTs is Lucas Control Systems Products of Hampton, Va., which produces LVDTs under the Shaevitz brand name.

In the case of large aboveground storage tanks, ambient external conditions produce horizontal temperature gradients in the stored liquid, which lead to the formation of convective currents and internal waves in the stored liquid. These phenomena, as well as residual error in attempts to compensate for tank shell expansion, have prevented accurate detection of leakage at low rates from large aboveground liquid storage tanks. Measurement of changes in height of liquid in a tank without accurate temperature measurement can only yield gross approximations of changes of the total mass of liquid stored in a tank.

Prior art systems have not been capable of accurate measurement of aboveground liquid storage tank leakage. The best results obtainable with presently known techniques are exemplified by the detection of leakage at a rate of 1.9 gallons per hour in a test of 24 hours duration reported for a volumetric system measuring liquid level and temperature conducted in 1993 by the American Petroleum Institute. For the purposes of that test, the level of liquid in the tank was lowered to 37.5 inches above the bottom of the tank. An orifice that leaks at the rate of 1.9 gallons per hour with a pressure head of 1.1 feet would, by extrapolation, leak at a rate of about 6 gallons per hour if the tank were filled to a normal operating height of 40 feet. Similar results were obtained by the American Petroleum Institute by the use of a mass balance system test conducted at the same low liquid level by means of a differential pressure gauge fitted in a vertical standpipe located outside the tank and connected to the tank by a conduit penetrating the tank wall.

Because of the environmental and economic value of prompt detection and remediation of leakage from large aboveground liquid storage tanks, a means for accurate detection of liquid leakage from existing large tanks which does not entail draining the tank or breaching the tank shell has long been needed and has, until the present invention, not been known.

SUMMARY OF THE INVENTION

It has now been found that an open ended vertical standpipe placed inside a tank so that the standpipe extends from near the bottom of the tank to a liquid level measurement chamber affixed to the standpipe at a location about 10 to 20 inches below the surface level of the liquid stored in the tank can be employed in a mass balance system in an environment in which thermal measurements and liquid level change measurements can be made with sufficient accuracy to achieve performance much improved over what has been known to the prior art. The system according to the present invention can detect leakage at a rate of less than 1 gallon per hour from a multi-million gallon storage tank filled to the maximum operating capacity of the tank. The probability of a false alarm can be held acceptably low.

In accordance with the invention, mass balance is achieved between the downward force of the total mass of a unit area of a column of liquid in the standpipe extending from the liquid surface to the bottom to be balanced by the upward force per unit area exerted by the total mass of liquid per unit area of the bottom surrounding the standpipe. Thermal expansion of the liquid outside the standpipe may produce a change in the liquid level outside the pipe without changing the liquid level in the standpipe chamber. The level of the liquid within the chamber may change in response to temperature changes in the standpipe or the chamber, but temperature in the small diameter standpipe can be accurately monitored and corrections can be applied accordingly. Convective currents and internal waves in the liquid surrounding the standpipe have little effect on the liquid within the standpipe.

Loss of mass due to leakage and/or thermal expansion of the tank shell will cause liquid level change of the same magnitude in both the chamber and the stored liquid outside the standpipe. Thermal measurements made on the exterior surface of the tank shell by specially shielded sensor assembles can be employed to reduce significantly any errors resulting from tank shell expansion.

Multiplication of the area of the tank by the observed liquid level change after compensation for thermal expansion, yields the leakage over the period of thermal change measured. Residual error, if any, results from inadequately compensating for thermal changes.

The standpipe employed in carrying out the method of the invention extends above the surface level of liquid in the tank and temperature sensors are positioned within the standpipe at locations spaced along the height of the standpipe to permit compensation for thermal expansion of the liquid. Accurate temperature measurements at multiple locations allow the definition of an accurate temperature profile free of perturbation by convective currents and internal waves which may exist in the liquid in the tank outside the standpipe.

The portion of the standpipe that extends above the liquid level is shielded from radiant energy and insulation is provided around the outer surface of the portion of the standpipe which extends through the ullage atmosphere to isolate the liquid in the standpipe near the standpipe surface from temperature extremes of the ullage atmosphere and to prevent turbulent temperature changes that might otherwise occur in the first 6 to 12 inches of liquid below the surface. The lower end of the standpipe is protected by a screen to prevent entry of particulate matter into the interior of the standpipe.

Changes in the liquid level within the liquid level measuring chamber are accurately detected by means of a linear displacement variable transformer (LDVT) situated within the chamber. The linear displacement variable transformer has its movable core attached to a float whose motion follows the level of liquid in the standpipe. Static friction between the movable transformer core and the surfaces defining a cylindrical aperture surrounding the movable core is essentially eliminated by suspending the LDVT from a universal joint which holds the LDVT above the float and keeps the axis of the cylindrical aperture parallel to the line of action of the force of gravity. Since the movable core and the surrounding cylindrical aperture are always aligned with the gravitational force there is no perpendicular force component and therefore no static friction. In the absence of friction the float moves freely in response to very small liquid level changes.

The temperature sensors for measuring the temperature of the metal shell of the tank are held firmly against the exterior surface of the shell in casings which shield the sensors not only from radiant energy but also from the effect of movement of the ambient air.

Voltage signals representative of liquid level changes and temperature obtained from the liquid level and temperature sensors are conducted to an analog-to-digital converter for storage in a computer and subsequent processing. Real time processing of the information, although ordinarily not necessary, can be performed if desired.

These and other features and advantages of the invention will be more fully understood when the following detailed description of a preferred embodiment of the aboveground tank leakage detection system is read in conjunction with the accompanying drawings, in which like parts are designated by like reference numbers.

DETAILED DESCRIPTION OF PREFERRED EMBODIMENT

Figure 1:
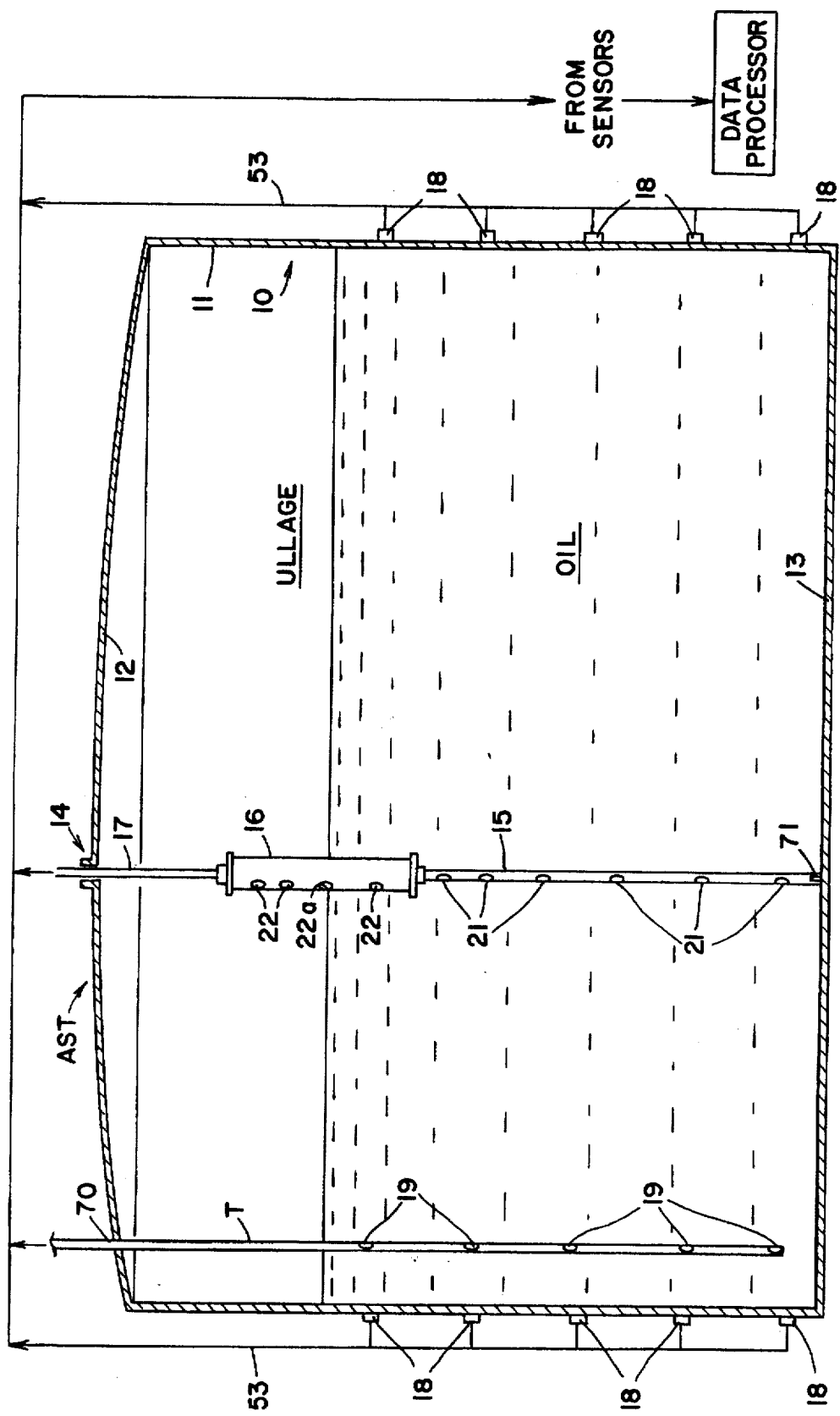
FIG. 1 is a simplified cross-sectional illustration of an aboveground liquid storage tank showing the locations of sensors in accordance with the invention.

FIG. 1 illustrates the placement of liquid level change detection and temperature measuring instrumentation for the detection of leakage from a large aboveground liquid storage tank or above surface tank AST. The tank AST comprises a metal shell generally designated by the reference numeral 10 with an upright cylindrical wall 11, a closed top 12 and a bottom 13. Tank 10 is shown as holding a mass of liquid, exemplified as a quantity of oil, above the surface of which there is shown some ullage within the tank 10. The location of a manhole or other access port through the tank top 12 is indicated at 14. A vertical standpipe 15, which can be formed by interconnected sections of sturdy rigid plastic material tube or graphite composite tube, extends upward from the tank bottom 13 to a liquid level measuring chamber 16. An upward tubular extension 17 of the standpipe 15 passes through the port at 14. The extension 17 can support electrical conductors leading from the sensors to a remote data collection site. These electrical conductors are not shown in the drawings for simplicity of illustration. Mounted on the outside of the wall 11 of the tank 10 are a plurality of vertically spaced temperature sensors 18 for measuring the temperature of the tank shell wall 11 at different heights above the ground. Preferably there are three arrays of sensors 18 arranged along three vertical lines at locations spaced apart by 120 degrees around the side wall of the tank, and additional sensors 18 can be deployed to measure tank shell temperature between the three vertically disposed arrays. Sensors at points 19 are disposed in a vertical array submerged within the oil in the tank 10 for measuring the temperature of the liquid level at different heights within the liquid mass.

A vertically spaced group of temperature sensors at locations 21 are arranged within the standpipe 15 to measure the temperature of the liquid at different heights within the standpipe. Finally, a group of temperature sensors indicated at points 22 is positioned within the liquid level chamber 16 so that there are temperature sensors above and below the liquid level in the chamber 16 for measuring the temperature of the liquid therein.

The temperatures measured by the sensors of each of the groups of sensors 18, 19, 21 and 22 provide data which can be used to determine periodically an average temperature of each of: the exterior of the shell wall 11 (sensors 18); the liquid in the interior of the tank AST (sensors 19); the liquid in the standpipe 15 (sensors 21); the liquid within the liquid level chamber 16 (sensors 22). To determine the average temperature measured by the sensors of each of the vertically disposed sensor arrays, the overall height of the array is divided into a plurality of horizontal layers representing layers of liquid in the tank 10 and the temperature data from the sensor located in each layer is accorded a weight proportional to the respective vertical layer thickness. Periodic polling of the sensor measurements for the several arrays and the computation of an average temperature record for each of the arrays provides the temperature information used in the leakage detection method of the invention.

It should be understood that the locations of the temperature sensors shown in FIG. 1 are merely illustrative of the invention, and that in practice, the locations of the sensors would be adapted to the characteristics of the aboveground tank AST in which the leakage detection system of the invention is being deployed.

By making accurate temperature and liquid level change measurements in accordance with the invention, it has been found to be possible to compensate for the effects of temperature on the system and thereby to detect even small leaks. Temperature has an effect on the liquid, such as oil, in the standpipe 15 and liquid level chamber 16 and on the circumference of the tank shell 11.

The mass balance leakage detection system of the invention works on the principle that pressure head in the standpipe 15 will remain in balance with the pressure head of the large body of liquid such as oil contained in the tank 10. The pressure is directly related to the weight of the liquid in a vertical column over a unit area normal to the direction of apparent gravity.

Change in the level of liquid within the tank is measured by means of a detector, which can be any device suitable for measuring changes in liquid level and producing an electrical signal representative of the measurements for correlation with the temperature records. The linear variable displacement transformer such as the LVDT sold under the trademark Schaevitz by Lucas Control Systems Products of Hampton, Va. has been found to provide the precision of level measurement desired for use in practicing the method of the invention.

The coefficient of thermal expansion of a given liquid such as a particular grade of fuel oil is known. If the coefficient of thermal expansion of the liquid stored in a tank from which leakage is to be detected is not known, the coefficient can be readily determined by the application of known tests to a sample of the liquid. The coefficient of thermal expansion for the tank shell structural material, for example, low carbon steel plate, is also known. The American Petroleum Institute has adopted API Standard 2550 "Method for Measurement and Calibration of Upright Cylindrical Tanks", which provides equations for deriving the expanded area of a low carbon steel tank (expansion factor= 0.0000062) from a change in the average shell temperature as follows:

$$A_T = K A_O$$

where $$K = 1 + 12.4 \times 10^{-6} \delta T_s + 4.0 \times 10^{-12} \delta T_s^2$$

with $A_O$=area of the tank with the steel shell at 60° F.
$\delta T_s = T_s - 60°$ F.
$T_s$=temperature of the steel in ° F.
$A_T$=area of the tank with steel tank temperature $T_s$ This Standard, which compensates for variation of the expansion coefficient of steel, differs by 0.032 percent/1° F. from a value for area expansion obtained by using the standard expansion coefficient of steel. For tanks of low carbon steel construction, the API Standard can be used in calculating the effect of thermal expansion on tank area.

Figure 2:
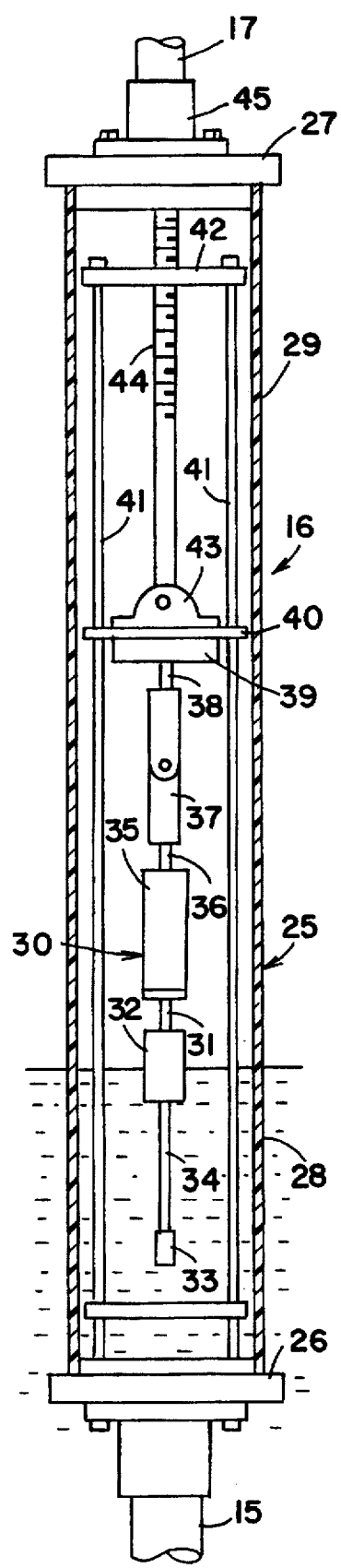
FIG. 2 is a view in cross-section of the liquid level measurement chamber and liquid level sensor according to the invention.

The presently preferred arrangement of a liquid level change detector in a liquid level chamber 16 is shown in FIG. 2. The chamber 16 has a cylindrical wall 25 of rigid material. The wall 25 can be made of hard clear plastic material such as acrylic tubing which permits viewing of the internal mechanism. The chamber has a flat toroidal base 26 secured to the upper end of the standpipe 15 and a cap 27 secured to the vertical standpipe extension 17. The lower portion 28 of the chamber 16 is below the surface of liquid in the tank as shown, and the upper portion 29 of the chamber 16 is above the liquid surface. The interior of the chamber 16 is in free communication with liquid in the standpipe 15 so that the level of liquid within the chamber 16 rises and falls in response to pressure changes at the bottom of the storage tank, thereby indicating the height of the liquid in the entire tank.

Changes in the position of the surface of the liquid in the level chamber 16 are measured by the LVDT 30, which has a movable core (not shown in the drawing) that is connected by a rigid rod 31 to a small float 32 carried by buoyancy at the surface of the liquid within the chamber 16. The fixed core (not illustrated) of the transformer which surrounds the movable core, is held at a constant height above the bottom 13 of the tank. Preferably the float 32 is a body of low density plastic material such as Nitrophyl which is resistant to attack by the liquid in which it floats.

A counterbalance weight 33 is shown mounted on a rod 34 that extends vertically downward from the float 32 to keep the float in its proper upright posture. The weight 33 and the rods 34 and 31 can be made of material such as stainless steel. The LVDT is a commercially available measuring device which need not be described in detail to those acquainted with the art, and is suitably housed in a cylindrical case 35 which can be made, for example, of aluminum for lightness of weight. The LVDT in its case 35 is suspended by a link member 36 from a universal joint shown at 37 which is in turn supported from above by a link member 38 suspended from a mounting bracket 39 affixed to the underside of a support disk 40, which can be formed, for example from low density polyethylene material.

The support disk 40, carrying the LVDT 30 and associated elements, is movable in the vertical direction within the chamber 16 on vertically extending guide rods 41. Preferably three such guide rods 41, at equally spaced locations, are fixedly mounted at their lower ends to the base 26, with the upper ends of the rods 41 secured to a plate 42 positioned within the upper portion 29 of the level chamber 16, as shown. The support disk 40 is preferably connected by means of a pillow block bearing 43 to the lower end of vertically extending threaded rod 44 which passes through a central opening defined in the plate 42 to an internally threaded coupling nut 45 positioned atop the cap 27 of the chamber 16. This arrangement permits accurate precise adjustment of the vertical position of the support disk 40 and hence, of the LVDT.

Voltage signals representing linear displacement measurements are conveyed to a remote information processing and data storage station (not shown) for correlation with temperature measurements for detection of changes in the quantity of oil in the tank.

If desired, more than one LVDT can be employed within the casing 16, either on a common support or on separate support linkages, to assure continuing measurement in case of failure of an LVDT.

The temperature measurements of the exterior of the shell wall 11 are (as shown in FIG. 1) made at a multiplicity of points because the temperature of the wall 11 is not uniform. Exposure of the wall 11 adjacent the point where temperature is measured to the heating effect of direct sunlight will raise the temperature, and the temperature of the medium within the tank contacting the interior of the wall 11 at that point will also affect the temperature measured. Since warmer, less dense fluid rises, a temperature gradient will exist within the body of liquid in the tank AST.

Temperature measurements at a plurality of different heights are called for, and are made in accordance with the invention by the arrangement of vertically spaced temperature sensors at 18 contacting the tank wall's exterior surface. Differences in temperatures at different locations around the circumference of the tank should also be taken into consideration. The system of the invention advantageously employs several arrays of vertically spaced temperature sensors 18 positioned along lines spaced around the circumference of the tank AST, for example, three lines of sensors spaced apart by 120 degrees from each other.

For purposes of illustration, FIG. 1 shows two arrays of sensors, each array consisting of five sensors 18 spaced vertically from each other along a vertical line. Electrical connecting lines for conveying voltage signals representative of temperatures detected by the sensors to a remotely located data processing and storage station are only schematically illustrated at 53 in FIG. 1.

Figure 3:
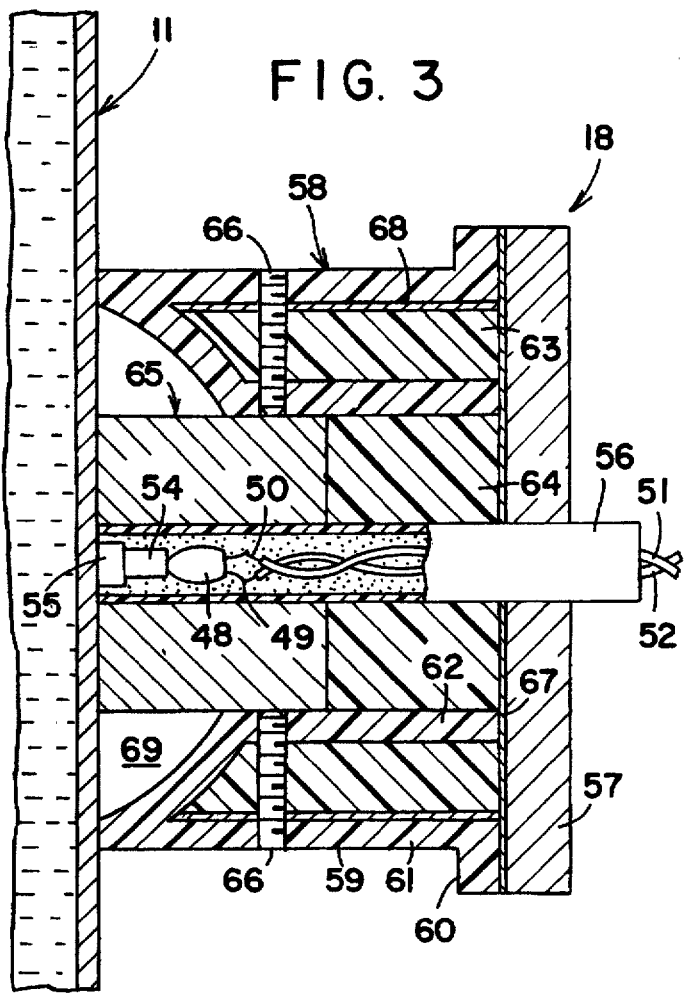
FIG. 3 is a view in cross-section of an external tank shell temperature sensor of the invention.

Each individual sensor 18, as shown in FIG. 3, comprises a temperature transducer which can advantageously be a thermistor of the well known type having a high negative coefficient of electrical resistance so that its resistance increases as temperature decreases, shown as a compact ceramic semiconductor body 48 with two terminals 49, 50 from which a pair of signal conducting wires 51, 52 lead to cable 53 (FIG. 1) through which voltage signals are carried to the remote station.

The inner portion of the body 48 contacts a plug 54 made of aluminum or other heat conducting material, and an inner surface 55 of the plug 54 is pressed against the outer surface of the tank shell wall 11 to conduct heat from the shell wall to the thermistor body 48.

A rigid tube 56 encloses the thermistor body terminals 49 and 50 and plug 54. When the plug 54 and thermistor 48 have been installed in place, the surrounding volume within the tube 56 is filled with a settable dielectric material such as epoxy resin.

The tube 56 passes through a disk-shaped panel 57 lying in a plane spaced from and parallel to a tangent to the tank shell wall 11 as shown in FIG. 3. The panel 57, which can suitably be made of hardwood or of rigid plastic material, serves as the front panel of generally cylindrical case 58 which protects the sensitive sensor elements 48, 49, 50 from the effects of sun and wind.

The body 59 of the temperature sensor case 58 is generally cylindrical in cross section as indicated in FIG. 3 and may have a peripheral lip 60 at its outer end, facing the back of the front panel 57 of the case 58.

In its presently preferred form, as illustrated in the drawing, the case body 59 has concentric cylindrical outer and inner walls 61 and 62, the space between the walls 61 and 62 being filled with light-weight insulating material such as polyurethane foam as shown at 63. A cylindrical volume 64 between the inner wall 62 of the case body 59 and the tube 56 is also preferably filled with insulating material such as polyurethane foam.

To hold the sensor case 58 in place against the steel tank wall 11, there is, as indicated, a cylindrical permanent magnet 65 to which the case body 59 is attached by set screws 66. Three such screws 66 preferably extend through pairs of aligned holes in the inner and outer walls 62, 61 of the case body 59 spaced apart at 120 degree angles to affix the case 58 firmly to the magnet 65. The inner end of the magnet 65 is directly in contact with the outer surface of the tank wall 11, holding the casing 58 firmly but removably in place.

As a further shield against radiation, reflective foil sheet material shown at 67 covers the back face of the front panel 57 of the case 58. Reflective foil is also preferably attached as shown at 68 to the inside of the outer wall 61 of the case 58.

The inner wall 62 of the case 58 can curve outward to join the outer wall 61 near the end of the case 58 that faces the shell wall 11, leaving a generally ring-shaped air space as shown at 69 around the magnet 65. It will be understood that the thermistor 48 could be enclosed and held in position for measuring the temperature of a tank wall by some form of protective housing different from the case 58, which is shown and described in detail as the preferred embodiment.

The temperature sensors located at 19, 21 and 22, which can comprise thermistors like the thermistors 48, do not require, and do not have, the shielding provided for the external temperature sensors 18 by their case structures 58. The sensors employed at 19, 21 and 22 can be commercially available high precision thermistor sensors as provided by various manufacturers for use in measuring temperatures within the range to which they may be exposed. These thermistors can be sealed by epoxy resin in stainless steel jackets for protection against damage.

Reverting to the illustration of FIG. 1, it can be seen that temperature sensors 19 are positioned at vertically spaced locations to measure the temperature of the liquid such as oil within the tank AST. The thermistors 19 (five shown) are preferably mounted on a rigid vertical rod or tube generally designated by the reference character T in FIG. 1, which serves to keep the several temperature sensors in their desired vertically spaced relationship despite exposure to currents flowing in the liquid which could otherwise move the sensors 19 out of position. Preferably the rod or tube T is positioned close to the inside of the tank wall 11, since a temperature gradient within the liquid is produced by the fact that the ambient temperature outside the tank and the average temperature of the tank contents can be quite different. This temperature gradient is steeper near the inside of the wall 11. The location of the rod or tube T carrying the sensors 19 will often be determined by the location of a pre-existing aperture indicated at 70 in the tank top 12. However, the array of sensors constituted by the several sensors 19 is not essential to the practice of invention, and may be omitted in some cases, for example where installation of the tube T would require the cutting of an opening through the top 12 of an existing tank. More than one array of sensors 19 can also be employed as may be required or desired.

The sensors at points 21 within the standpipe 15, can, like the sensors at 19, be commercially available high precision thermistors sealed in stainless steel jackets with epoxy resin for protection against damage. The sensors 21 are preferably mounted on the inside of the wall of standpipe 15 at vertically spaced locations to measure the temperature at different heights within the standpipe 15 below the chamber 16. As indicated in FIG. 1, the sensors 21 are spaced more closely together near the surface of the liquid than at the lower part of the tank, because the differences between the temperature within the standpipe 15 normally changes more sharply closer to the liquid surface than it does lower down in the tank.

Finally, there is an array of temperature sensors 22 located within the liquid level chamber 16 itself. The sensors 22 can be of the same type employed at 19 and 21, high precision thermistors sealed with epoxy resin in stainless steel jackets. Some of the sensors 22 are positioned above the level of liquid within the level chamber 16 and serve to measure the air temperature within the upper part of the chamber 16. At least one sensor 22 is positioned below the liquid level in the chamber 16, and one sensor 22a is shown to be located at about the surface level, which, of course, varies up or down, while the rest of the sensors 22 are in fixed positions, preferably attached, for example by adhesive, to the inside of the wall of the chamber 16 at positions where they will not interfere with the movement of the level sensing linkage elements. The sensors 22 themselves are not shown in FIG. 2 for the sake of simplicity. As in the case of the sensors 18, 19 and 21, the sensors 22 have their leads connected to electrical wires for carrying voltage signals representative of temperatures detected by the sensors to a remote location for processing. These electrical conductors are not shown in the drawings.

Tests have been conducted which demonstrate that the system of the invention can be used to detect leaks of less than 0.5 gallons per hour from a one million gallon tank over a 36 hour test period. The tests confirmed that temperature measurements in a standpipe assembly are free of thermal "noise" produced by turbulent convection currents and internal waves in the liquid in an aboveground storage tank, showing that ambient weather conditions do not necessarily prevent accurate leakage detection in large aboveground storage tanks. Ambient weather conditions were monitored during testing.

In the experimental tests, the standpipe 15 consisted of an open vertical tube and a level measurement chamber 16. The vertical tube 15 extended from a base 71 at the bottom 13 of the tank to the bottom of the level measurement chamber 16. The standpipe 15 was open to oil stored in the tank at its bottom and open to ullage at its top. A suitable screen was provided at the open bottom end of the standpipe 15 to prevent the entry of solid matter into the interior of the standpipe 15. The level measurement chamber 16 had an internal diameter of 5.5 inches and the internal diameter of the standpipe 15 was 1.05 inches. The length of the standpipe 15 was adjusted so that the chamber 16 was filled to a level of about 10 to 20 inches with oil.

The thermistor arrays 18, 19, 21 and 22 and the level sensor 30 were connected by electrical cable to instrumentation at ground level near the tank AST. The measurement signal-carrying conductors terminated in a computer controlled multiplexer and analog-to-digital converter that periodically polled and recorded the data from each sensor at a selected rate. The data was stored on hard and floppy disks for later processing and data analysis. Processing and analysis software, which need not be described in detail to those skilled in the art, was employed to execute the calculations required to convert the data into output showing the amount of leakage detected.

According to the manufacturer's specifications, the LVDT has a precision of $2 \times 10^{-5}$ inches and a thermal drift rate of $4 \times 10^{-6}$ inches/° F. The linearity of the measurements was rated to be better than $1.25 \times 10^{-4}$ inches over the full range of ±0.05 inches.

High precision thermistors connected in a 4-wire node were used for the arrays 19, 21, 22 within the tank AST. The thermistors used in this manner had a rated precision of $2 \times 10^{-4}$ and a drift rate less than $1.4 \times 10^{-5}$° F./hr at 60° F. based on the manufacturer's specifications.

The arrays of external thermistors 18 were connected in 2-wire configuration with cable runs of about 150 feet. The external thermistor had a precision of $2 \times 10^{-4}$° F. but were expected to drift up to ±0.002° F. due to temperature related changes in cable resistance. The precision of the externally mounted thermistor was comparable to the 4-wire system.

The data acquisition system was a Hewlett Packard 75000 Series multiplexer and analog to digital converter, a 22 binary bit system with a resolution of 5½ digits and a stability of 0.015%±1 mV over 90 days. As used in the experimental system, such stability represents a drift measurement of $1.5 \times 15^{-4}$ inches over 90 days. Tests have been conducted over several 24 hour periods showing stability better than $5 \times 10^{-5}$ inches per day.

The oil in the tank tested was a mixture of No. 6 fuel oil and No. 2 fuel oil having a pour point above the anticipated low temperature for the unheated tank. The average API gravity of the oil mixture was 21.1, indicating a specific gravity at 60° F. of 0.9273. Applying empirical relations described by ASTM D 1250-80, Volume X, the coefficient of thermal expansion for a fuel oil at 60° F. with a specific gravity of 0.9273 is found to be $4.12 \times 10^{-4}$.

The LVDT 30 located in the liquid level chamber 16 was supported at a fixed distance from the bottom 13 of the tank. The movable core of the transformer, which is not shown in the drawings, was attached to the float 32 supported by the buoyancy of the oil in the level chamber 16 as described above. The float 32, and hence the movable core, rise and fall with the surface level of the oil in the chamber 16. The float employed in the experimental test weighed approximately 13 grams in air and it floated in the oil of specific gravity 0.9270 at a depth of about 0.7 inches. Since the density of a petroleum derivative increases with decreasing temperature, the float would rise or sink slightly as the density of the oil changed. The change in the level of the float attributable to a change in temperature of the oil near the surface was calculated to be $2.9 \times 10^{-4}$ inches per °F. Surface temperature was measured and a correction was applied to the test data record to compensate for the change.

The data collected for a test performed in accordance with the invention consists of a number of data records collected with a fixed time interval between data records over the duration of the test. The length of a data span to be used in analysis of the data is specified and each record is processed to determine the change in the observed liquid level and the change in expected level over the time of the data span preceding the record. For example, a 48 hour test might consist of 289 data records collected at 10 minute intervals. If the data span selected for each rate analysis is 24 hours, then a data set would be generated consisting of 145 pairs of observed level change and expected level change over the previous 24 hour period.

The apparent cumulative leakage volume over the time span preceding each data record is derived by multiplying the surface area of the liquid in the tank by the difference between the measured level change and the expected level change over the data span. The result of the calculation is the sum of any time leakage and rendered errors in measuring the level change and calculating the expected level change. This process is repeated for every record in the data set of observed and expected level changes.

A negative value for the apparent leakage volume is a flow out of the tank. The average leakage volume per hour (leak rate) for each data span is derived by dividing the cumulative leakage over the data span by a length of the data span expressed in hours. Error free data should yield a constant zero value for a test of a tight tank and a constant negative value for a leaking tank. Variations in leak rate over the period of a test are an indication of uncompensated errors. Repeating the testing procedure will permit whatever calibration or compensation may be required to assure the desired accuracy within the capability of the system.

Additional measurements can also be taken at intervals corresponding to the intervals at which the several temperature sensors and the liquid level sensor are polled. Thus, a temperature sensor outside of and not attached to the tank can be used to measure ambient temperature. Wind speed outside the tank can also be measured by use of conventional measuring devices and the program for processing the data can be modified to make appropriate compensation for these measurements as well.

What is described is a system and method for quantitative leakage detection which can effectively be employed for large aboveground fluid storage tanks.

What is claimed is:

1. A method for quantitative detection of leakage from an aboveground storage tank, defined by a surrounding tank shell, a tank top and a tank bottom and containing liquid whose level is below said tank top, comprising vertically positioning in the tank a standpipe with an open bottom end thereof on said tank bottom permitting said liquid to enter the standpipe, said standpipe extending upward to an open top end thereof above said liquid level, said standpipe further having a liquid level measuring chamber portion within the length of the standpipe and having a length portion above and a length portion below the level of said liquid within the tank; positioning a first array of vertically spaced temperature sensors within and along said standpipe including said chamber portion for measuring temperatures of liquid within the standpipe and the liquid level measuring chamber portion; and positioning a second array of vertically spaced temperature sensors against the outside of said shell of the tank for measuring temperatures along the tank shell; and including the steps of: polling the sensors of said first and second arrays to obtain average temperatures of the liquid within the standpipe including said chamber portion and of the tank shell at a time n; measuring any change in the level of liquid within the liquid level chamber portion during a time interval between the time n and a time n+1; polling the sensors of said first and second arrays to obtain average temperatures of the liquid within the standpipe including said chamber portion and of the tank shell at the time n+1; comparing the average temperatures at the times n and n+1 to obtain temperature difference measurements for the liquid within the standpipe including said chamber portion representing the change in the average temperature of the liquid in the tank and a change in the average temperature of the tank shell related to a change in the cross sectional area of the tank; and using the temperature difference measurements and the liquid level change measurements to determine an amount of leakage from the tank during said time interval.

2. A method for quantitative detection of leakage from an aboveground storage tank comprising repeating the steps of claim 1 during a measurement period consisting of multiple time intervals and adding together the amounts of leakage determined during the measurement period.

3. The method of claim 1 and including positioning a third array of vertically spaced temperature sensors within the liquid in the tank outside the standpipe for measuring temperatures of the liquid, and polling the sensors of said third array to obtain an average temperature of the liquid within the tank, and comparing the average temperatures of the liquid within the tank at times n and n+1 to obtain a third temperature difference measurement.

4. The method of claim I and including measuring the temperature within the liquid level measuring chamber above the liquid level.

5. The method of claim 1, wherein said first array of temperature sensors extends substantially to the bottom of said tank.

6. A system for detecting liquid leakage from an aboveground storage tank defined by a tank bottom, a tank top and a cylindrical tank shell wall for containing said liquid to a level below said tank top, comprising a vertical standpipe having a lower portion mounted on and open at its bottom end to receive said liquid at the tank bottom and extending upward from the tank bottom to a liquid level chamber portion of the standpipe which extends vertically across an anticipated surface level of said liquid within the tank, an upper portion of said standpipe extending vertically upward from communication with said liquid level chamber portion through said top of the tank, and a liquid level change detector in the liquid level chamber portion for detecting any change in the surface level of liquid therein, an array of vertically spaced temperature sensors mounted within and along the standpipe from substantially the bottom of said lower portion at least to and including said liquid level chamber portion for measuring temperatures of liquid within the standpipe, a second array of vertically spaced temperature sensors mounted on the outside of the tank shell for measuring temperatures thereon, means for polling the sensors of said first and second arrays to obtain average temperature measurements, and means for periodically combining the average temperature measurements with information obtained by the liquid level change detector to determine any change of mass of liquid in the tank within any time period between said combining of measurements.

7. The system of claim 6 and including a third array of vertically spaced temperature sensors positioned to be within the liquid in the tank outside said standpipe.

8. The system of claim 6 wherein the temperature sensors are thermistors.

9. The system of claim 6 wherein the liquid level change detector is a linear variable displacement transformer suspended from a universal joint mounted within the liquid level chamber portion.

10. The system of claim 9 wherein said liquid level chamber portion has means therein which movably mount said universal joint for vertical positioning of the joint and said linear variable displacement transformer within the chamber portion.

11. The system of claim 10, wherein said linear variable displacement transformer has a float suspended therefrom for floating on liquid when within said liquid level chamber portion, and a weight suspended from said float for retaining said float in upright position when floating on liquid within the chamber portion.

12. The system of claim 6 wherein the array of temperature sensors mounted on the outside of the tank shell includes a plurality of groups of vertically spaced sensors arranged in vertical lines spaced 120 degrees apart about the circumference of the tank.

13. The system of claim 6, wherein the temperature sensors of the first said array of vertically spaced temperature sensors which are within said lower portion and within said liquid level chamber portion of said standpipe at locations below but close to said liquid level are spaced closely together as compared with the spacing between those of said vertically spaced temperature sensors as are mounted at locations within said lower portion of said standpipe close to said tank bottom.

14. The system of claim 13, wherein at least one of said sensors within said liquid level chamber portion is positioned above said anticipated liquid surface level therein, at least one of said sensors within said liquid level chamber portion is positioned below said anticipated liquid surface level therein, and at least one of said sensors within said liquid level chamber portion is positioned substantially at said anticipated liquid surface level therein.

* * * * *